July 9, 1940.  E. H. PICHA  2,207,353

MOTOR DRIVEN FLEXIBLE MOWER

Filed May 20, 1938  3 Sheets-Sheet 1

Inventor:
Emil H. Picha.
By Whiteley and Ruckman
Attorneys.

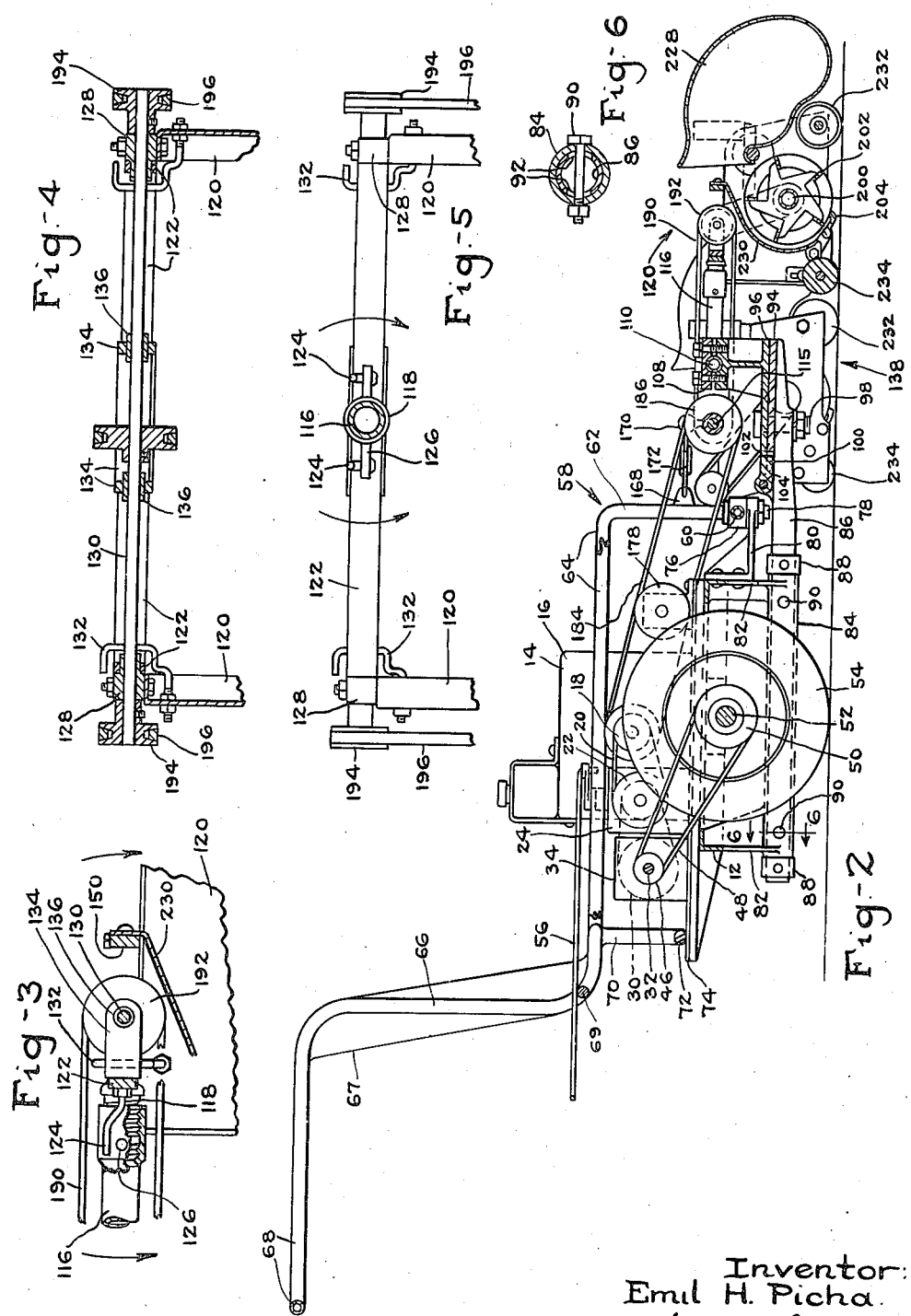

July 9, 1940.  E. H. PICHA  2,207,353
MOTOR DRIVEN FLEXIBLE MOWER
Filed May 20, 1938  3 Sheets-Sheet 3
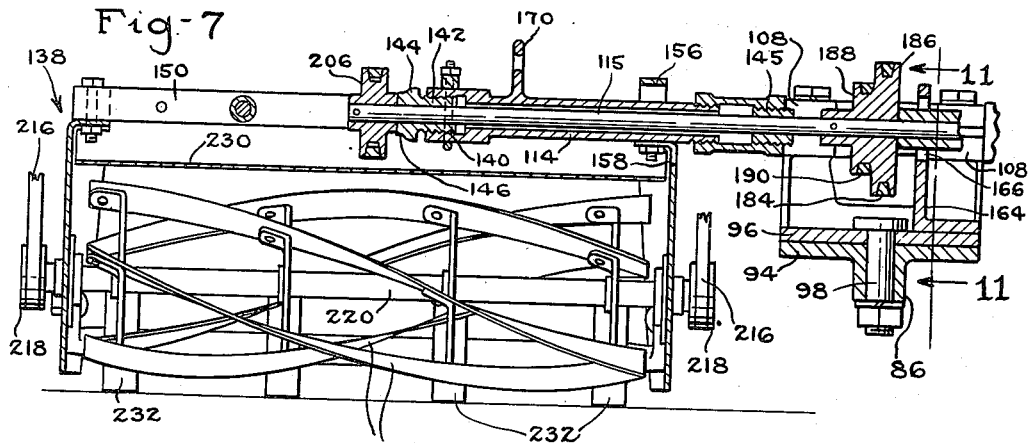
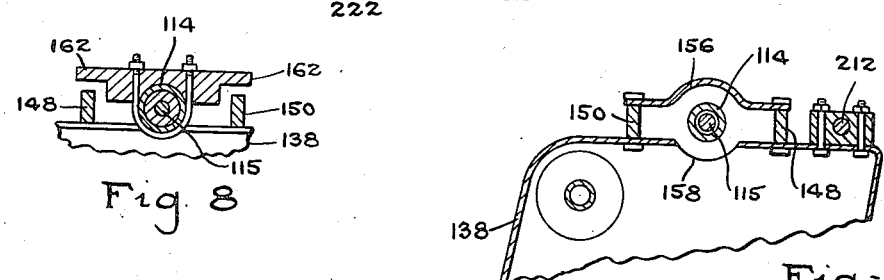
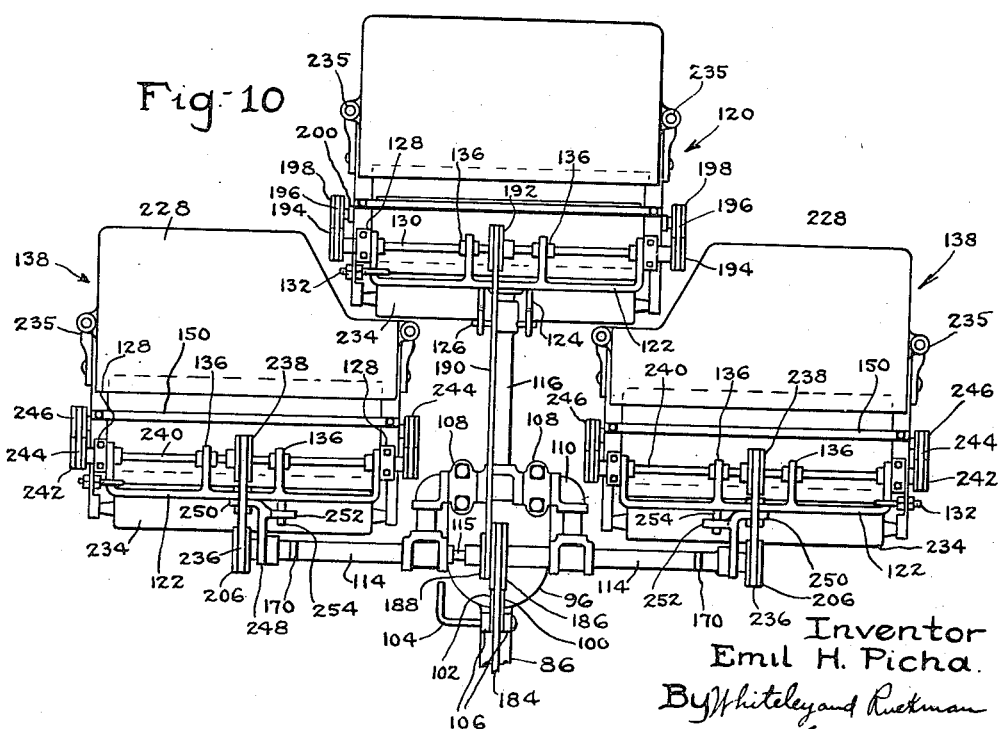
Inventor
Emil H. Picha.
By Whiteley and Ruckman
Attorneys Patented July 9, 1940

2,207,353

UNITED STATES PATENT OFFICE 2,207,353

MOTOR-DRIVEN FLEXIBLE MOWER

Emil H. Picha, St. Paul, Minn.

Application May 20, 1938, Serial No. 209,016

13 Claims. (Cl. 56—7)

My invention relates to motor-driven flexible mowers. While designed more particularly for cutting the grass on putting greens of golf courses, the device is susceptible of use for cutting grass in other places. However, as is well known, the grass on putting greens is kept very short by frequent cutting. Also, putting greens are not usually regular in shape and are not level, but are wavy or provided with hollows and rounded places so that it has been difficult or practically impossible to cut the grass uniformly short with cutting devices previously used. An object of the present invention is to provide a device which will not only overcome such defects, but which at the same time can be conveniently operated and also manufactured at a minimum of expense.

An important object of the invention is to provide a device of this character embodying a number of mowers which are flexibly supported so that they may have independent rocking movement both transversely and longitudinally. Another object is to provide a tractor connected with a support for the several mowers in such manner that the tractor and said support may have relative rocking movement both transversely and longitudinally.

In cutting putting greens, it is customary to cut around the edge of the green and to cut the main portion of the green back and forth, the direction of which is changed from day to day in order not to give a "grain" to the lie of the grass. Another object therefore of my invention is to provide a cutting device which may be steered for cutting around the edge of the green and may be set to travel straight ahead across the green, provision being made that the device may be readily turned to travel in the opposite direction when the end of each "cut" is reached.

The novel features which I believe to be characteristic of my invention are set forth with particularity in the appended claims. The invention itself, however, both as to its organization and method of operation, together with additional objects and advantages thereof will be best understood from the following description of specific embodiments when read in connection with the accompanying drawings in which, Fig. 1 is a top plan view of the device.

Fig. 2 (sheet 2) is a view in section on the line 2—2 of Fig. 1.

Fig. 3 is a view in section on the line 3—3 of Fig. 1.

Fig. 4 is a view in section on the line 4—4 of Fig. 1.

Fig. 5 is a view in section on the line 5—5 of Fig. 1.

Fig. 6 is a view in section on the line 6—6 of Fig. 2.

Fig. 7 (sheet 3) is a view in section on the line 7—7 of Fig. 1.

Fig. 8 is a view in section on the line 8—8 of Fig. 1.

Fig. 9 is a view in section on the line 9—9 of Fig. 1.

Fig. 10 is a top plan view of a modified form of mower construction.

Figures 1, 11:
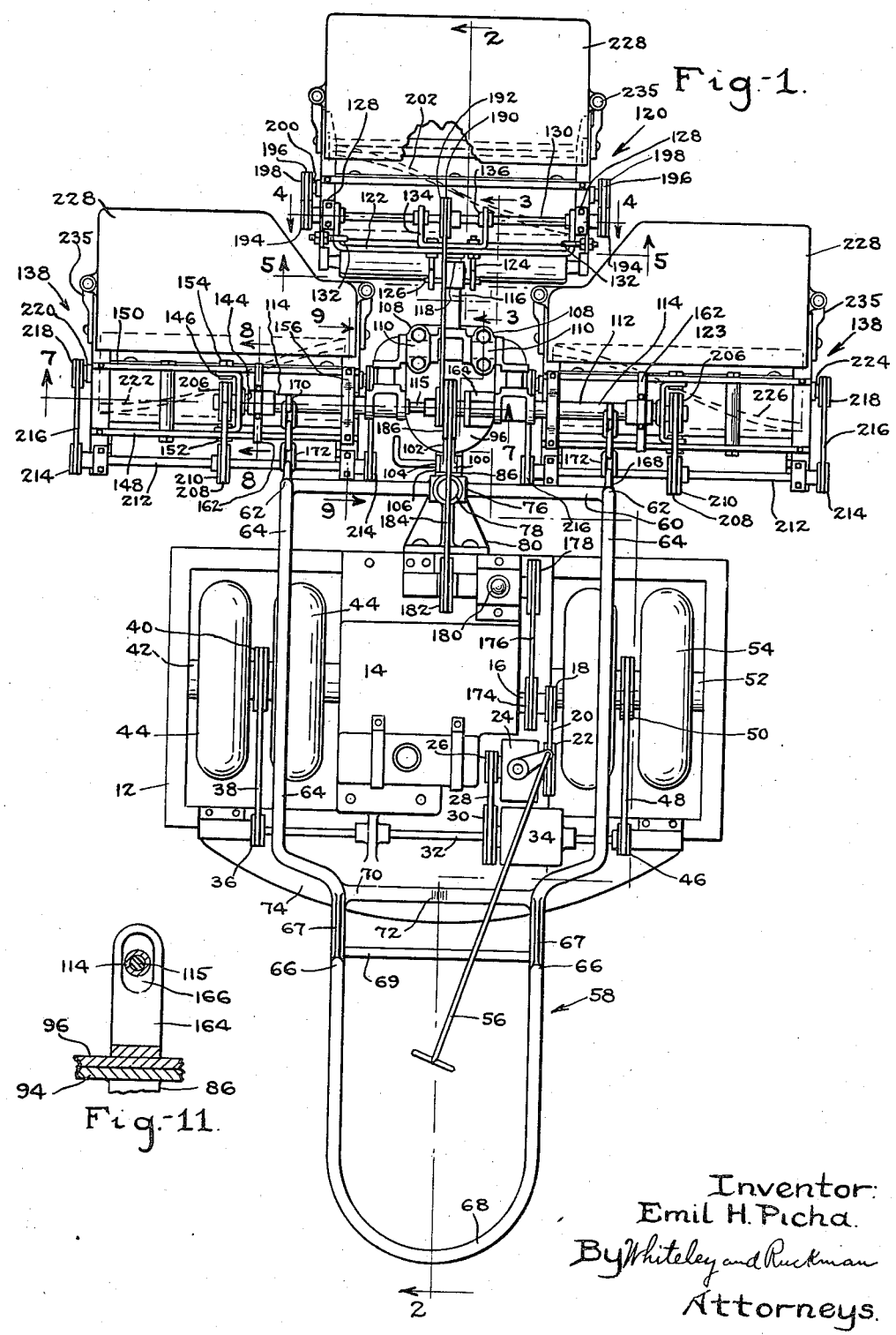
Fig. 11 (sheet 1) is a view in section on the line 11—11 of Fig. 7.

In carrying out my invention, I provide a tractor frame 12 which carries a motor 14 having a shaft 16 to which a pulley 18 is secured (see Fig. 2). The pulley 18 is connected by a belt 20 with a pulley 22 secured to one member of a clutch 24 (see Fig. 1). The other member of this clutch is secured to a pulley 26 which is connected by a belt 28 with a pulley 30 secured to a shaft 32 embodying a differential 34. Secured to the shaft 32 at one side of the differential, is a pulley 36 connected by a belt 38 with a pulley 40 secured to a shaft 42 to which ground engaging wheels 44 are secured. At the other side of the differential, a pulley 46 is secured to the shaft 32 and this pulley is connected by a belt 48 with a pulley 50 secured to a shaft 52 to which ground engaging wheels 54 are secured. A hand operated rod 56 connected with one of the members of the clutch 24 serves to cause engagement and disengagement of the clutch 24.

A pipe formation designated in general by the numeral 58 is positioned mostly above the tractor frame 12 (see Fig. 2). However the pipe formation embodies a lower transverse horizontal member 60 from the ends of which vertical members 62 extend upwardly. From the upper ends of these vertical members, horizontal members 64 extend rearwardly and are then turned upwardly to form vertical members 66 which have reinforcing pieces 67. The upper ends of the members 66 are bent rearwardly and continued as a horizontal U-shaped member 68 to form handles which may be grasped by the operator who walks at the rear of the tractor. The lower portions of the members 66 are connected by a tie rod 69 upon which the clutch operating rod 56 rests. The rear ends of the members 64 are connected by a rod 70 which converges downwardly from its ends to form an apex 72 resting upon a plate 74 which constitutes a platform member of the tractor frames and supports the motor, the differential and the clutches. Centrally of the pipe member 60, a block 76 is interposed, the adjacent ends of the member 60 being welded thereto. The block 76 is pivoted by a bolt 78 in the forward end of a bracket 80 secured to the frame 12.

Members 82 extend downwardly for a desired distance from the frame 12 and support a pipe 84 which telescopically receives a pipe 86. Collars 88 secured to the inner pipe 86 adjacent the respective ends of the pipe 84 normally prevent longitudinal movement of the pipe 86 in the pipe 84. As shown in Fig. 6, bolts 90 pass snugly through the outer pipe 84 and through arcuate slots 92 in the pipe 86 thereby providing for limited turning movement of the two pipes relatively to each other. The forward end of the pipe 86 is secured to a plate 94 upon which rests a plate 96 (see Figs. 2 and 7). A bolt 98 passes through the plates 94 and 96 so that under certain conditions, the two plates can turn relatively to each other for steering purposes. However in order to prevent such movement when desired, a dog 100 is engaged in openings 102 in the two plates. The dog 100 is pivotally mounted at 104 upon ears 106 extending up from the pipe 86 as will be understood from Fig. 1.

The plate 96 as best shown in Fig. 7, carries bearings 108 in which is mounted the horizontal tubular member 110 of a mower support designated in general by the numeral 112. The member 110 outside of the two bearings 108 is turned rearwardly as shown in Fig. 1 and carries support housings 114 for a shaft 115. A tube 116 extends forwardly from the middle of the support member 110. Pivotally mounted at 118 upon the forward end of the support member 116, as shown in Fig. 5, is the frame of a central forward mower designated in general by the numeral 120. A cross bar 122 at the forward end of the member 116 is provided with rearward projections 124. Pins 126 extending out from opposite sides of the member 116 are adapted to be engaged by the projections 124 and thus limit the extent of transverse rocking movement which the mower frame 120 may have, as shown by arrows in Fig. 5. As shown in Fig. 4, the side members of the mower frame 120 are provided with bearings 128 in which a shaft 130 is rotatable. The mower frame may have forward and backward rocking movement around the shaft 130 as shown by arrows in Fig. 3. To limit the extent of this rocking movement, the side frame members are provided with stops 132 which limit the extent of this movement by engagement with the forwardly turned ends of the bar 122. As shown in Fig. 1, a central member 134 is secured to the bar 122 and has forwardly turned ends which carry bearings 136 for the shaft 130 as shown in Figs. 3 and 4. It will thus be apparent that the mower frame 120 is capable of rocking movement both transversely and longitudinally according to the contour of the ground which is being mowed.

The two support housings 114 previously referred to, pivotally support side mower frames 138 respectvely. The manner of supporting the left hand frame 138 is shown in Fig. 7 and it will be understood that the right hand frame is supported in similar manner. The outer end of the housing 114 is enlarged and is provided with internal threads 140 which receive external threads 142 formed on a bearing 144 for the shaft 115 which also has a bearing 145 carried by the support 112. As will be understood from Fig. 1 the bearing 144 is carried by a bar 146 which extends between two frame bars 148 and 150 secured to the end plates of the mower frame 138. The ends of the bar 146 are turned at right angles and attached to the bars 148 and 150 by pivots 152 and 154 thus permitting the mower frame to have transverse rocking movement, the extent of which is limited by stops 156 and 158 carried by the mower frame, the stops 158 being formed in said frame. The engagement of the threads 142 in the threads 140 is such that they may readily turn therein thus providing for forward and backward rocking movement of the mower frame. The extent of this rocking movement is limited by stops 162 carried by the housing 114 coming into engagement with the bars 148 and 150 previously referred to and as shown in Fig. 8. It will thus be apparent that the two side mower frames as well as the forward mower frame are capable of independent rocking movement both transversely and longitudinally according to the contour of the ground which is being mowed.

As will be apparent from Figs. 7 and 11, the plate 96 is provided with an upstanding projection 164 containing a vertical slot 166 through which the member 114 surrounding the shaft 115 passes. In case the mower support is not counterbalanced, the material at the top and bottom of the slot 166 constitutes stops for limiting the rocking movement of the mower support 112. As will be seen from Figs. 1 and 2, the pipe members 62 are provided with ears 168 while the housings 114 are provided with ears 170. Chains 172 at each side of the central longitudinal line of the machine connect the ears 168 and 170 respectively. The provision of these chains enables the mowers to be guided by the operator when the dog 100 is released.

The manner in which rotary cutting members of the three mowers are operated will now be described. As shown in Fig. 1, the motor shaft 16 is provided with a pulley 174 connected by a belt 176 with a pulley 178 secured to one member of a clutch 180, the other member of which has a pulley 182 secured thereto. The pulley 182 is connected by a belt 184 with a pulley 186 secured to the shaft 115. This shaft also carries a pulley 188 which as shown in Fig. 7 is integral with the pulley 186. The pulley 188 is connected by a belt 190 with a pulley 192 secured to the shaft 130 previously referred to. Secured to the ends of the shaft 130 are pulleys 194 which are connected by belts 196 with pulleys 198 secured to the ends of a shaft 200. This shaft carries helical cutting members 202 which cooperate with a cutting bar 204 fixedly carried by the mower frame. Secured to the ends of the shaft 115 are pulleys 206 which are connected by belts 208 with pulleys 210 secured to the middle of shafts 212, there being one of these shafts for each of the two side mowers. Secured to the ends of the shafts 212 are pulleys 214 which are connected by belts 216 with pulleys 218. As shown in Fig. 7, a pulley 218 is secured to each of the ends of a shaft 220 which carries helical cutting members 222 for the left hand mower. As will be understood from Fig. 1, a pulley 218 is secured to each of the ends of a shaft 224 which carries helical cutting members 226 for the right hand mower. All of the helical cutting members may be inclined either right hand or left hand. However when the cutting members are rotated very rapidly by a motor, there is some tendency to throw the cut grass sidewise. Therefore in Fig. 1, I have shown that the cutting members 222 and 226 may be reversely inclined so as to throw the cut grass to the outer sides of grass catchers.

As shown particularly in Fig. 2, the mower frames are provided with grass catchers 228, guards 230, caster wheels 232 and rollers 234. The grass catchers 228 are removably attached at 235 to the mower frames.

The modification shown in Fig. 10 is substantially the same as the form previously described except for the pivotal mounting of the two side mower frames. The same reference numerals so far as applicable will therefore be employed, it being noted that the pivotal mounting of the side mower frames is similar to that previously described for the forward mover frame, so that in the form shown in Fig. 10, all three mower frames are pivotally supported in similar manner. In providing this pivotal mounting for the two side mower frames, the member 116 is made longer than in the prior construction. The pulleys 206 secured to the ends of the shaft 115 are connected by forwardly extending belts 236 with pulleys 238 secured to the middle of shafts 240 mounted in bearings carried by the mower frames. Secured to the ends of the shafts 240 are pulleys 242 which are connected by belts 244 with pulleys 246 secured to the ends of the shafts to which the cutting members are secured. The stops 132 act in the manner previously described, while members 248 secured to the housings 114 pivotally support the cross bars 122 previously referred to. For this purpose, the members 248 are pivotally attached to the cross bars at 250 and have forks 252 which straddle pins 254 secured to the bars 122 thus providing for transverse rocking movement of the side mower frames.

The operation and advantages of my invention will be readily understood in connection with the foregoing description and the accompanying drawings. The tractor is easily manipulated and controlled by the operator who in the embodiment of the invention shown, walks behind and may grasp the handles and steer the device with a high degree of precision for cutting around the edge of the green when the dog 100 is released. When this dog is engaged, the device will travel across the green without the operator being concerned with steering. When the end of each straight across cut is reached, the operator by bearing down upon the handle may lift the mowers from the ground and turn the device upon the ground wheels 44 and 54 into position to make the return cut. The tube 84 will of course be positioned sufficiently high so that the tractor frame may be tipped at the rear for this purpose. The grass will be cut uniformly short since as previously explained, the mower frames are capable of independent rocking movement both transversely and longitudinally while the tractor and mower support may have relative rocking movement both transversely and longitudinally. Provision is therefore made for all irregularities of the ground. In case it is desired to use the tractor for other purposes, it may be readily disconnected from the mower part of the device upon removing the rear collar 88.

Additional advantages of my motor-driven flexible mower may be summarized as follows. It will increase the production of the operator per man without increasing the labor per man. At the same time, the quality of work done is favorably comparable with that done by hand pushed single unit mowers. This result is accomplished by attaching the units to a support in three places respectively in such manner that each unit operates independently under the same condition as the other units in regard to freedom of pivotal movement for hugging the ground regardless of how wavy or uneven it may be. Each unit bears the same weight or pressure as the other units because all units are attached at like points and while being pushed react alike. Also on account of delivering the power in similar manner to the center of each unit, all of the units react alike without liability of being twisted or tilted at either corner. The green may be cut in all directions for the full length or breadth thereof. This may be accomplished due to the fact that by bearing down on the tractor handle, all of the units are raised from the ground together and the mower may then be reversed in direction beyond the edge of the green for the return cut. In other words, all of the units are raised simultaneously on the tractor axle without the provision of extra levers. Close coupling of the mower units is permitted on account of one unit having its cutting members spiralled right hand and another one spiralled left hand whereby the cut grass is thrown outwardly to be received by the grass catchers. The cutting members of each unit revolve forwardly freely and independently of the others permitting each bed knife to be properly adjusted independently of the others. When the machine is operating, the support for the cutting units serves the purpose of a front axle of the tractor.

I claim:

1. In combination with a wheeled frame and motor thereon of a flexible motor-driven mower, said frame embodying members carried forwardly of the wheels and motor drive thereof, bars pivotally mounted on said members to swing in a longitudinal plane, a plurality of cutting units, means connecting said cutting units with said bars to swing about an axis transverse to the axis of movement of said bars, whereby the cutting units are held for independent rocking movements both transversely and longitudinally, and flexible driving connections for operating said cutting units from the motor.

2. In combination with a wheeled frame and motor thereon of a flexible motor driven mower, said frame embodying members carried forwardly of the wheels and motor drive thereof, bars pivotally mounted on said members to swing in a longitudinal plane, a plurality of cutting units each embodying a transverse rear frame member, means connecting said frame wheels at their centers with said bars to swing about an axis transverse to the axis of movement of said bars, a pulley mounted on each of the cutting units in the plane of said last named cutting means, and flexible driving connections to said several pulley for operating said cutting units from the motor.

3. In combination with the frame of a motor driven member, a forwardly extended frame member pivotally connected therewith embodying laterally extended tubular members and a central forwardly extended member, bars pivotally mounted adjacent the end portions of said laterally and forwardly extended members, and independent cutting unit pivotally connected with each of said bars to swing around an axis transverse thereto, a driven shaft extending through the said first named tubular members, a pulley located on each of said cutting units in the plane of said last named pivotal connection, and belt and pulley connections from said driven shaft with each of said pulleys for independently driving the cutting mechanism.

4. In combination with the frame of a motor driven member, a forwardly extended frame pivotally connected therewith embodying laterally extended tubular members and a central forwardly extended member, a cutting unit having pivotal connection with the end portions of said transverse tubular members and a third cutting unit having pivotal connection with the end of said forwardly extended frame member, a driven shaft extending through said first named tubular members, an independent shaft for operating each of said cutting units, a pulley located in the plane of the pivotal connection of each of said cutting units on each of said independent shafts, and belt and pulley connections from said driven shaft with each of said pulleys independently driving the cutting mechanisms.

5. In a device of the character described, the combination of a main frame, a central member extending out from the front of said frame, a plate carried by said central member, a second plate attached to said first plate by a vertical pivot to provide for relative sidewise turning movement of the plates, mower structure supported from said second plate, a releasable device for locking said plates together, and steering mechanism between said main frame and said mower structure adapted to cause said sidewise turning movement when said locking device is released.

6. In a device of the character described, the combination of a wheeled frame, a motor carried by said frame, a mower support attached to said frame, mower frames carried at the two opposite sides of said support respectively, helical cutting members carried by said mower frames respectively, said helical cutting members being reversely inclined with relation to each other, connections for driving said cutting members from said motor, and grass catchers attached ahead of said cutting members respectively, the outer portions of said catchers having greater grass carrying capacity than their inner portions and said cutting members being arranged to throw the cut grass toward the outer portions of said catchers respectively.

7. In a device of the character described, the combination of a tractor having a frame, a motor supported by said frame, a mower support, a tube secured to said tractor frame, a second tube connected to said mower support and having telescopic engagement with said first tube, a detachable device associated with said tubes adapted to prevent relative longitudinal movement thereof and which when detached permits said tubes to be separated, cutting mechanism carried by said mower support, and detachable driving connections between said motor and said cutting mechanism.

8. In a device of the character described, the combination of a tractor having a frame, a motor supported by said frame, a mower support, a tube secured to said tractor frame, a second tube connected to said mower support and having telescopic engagement with said first tube, a device associated with said tubes adapted to prevent relative longitudinal movement thereof, means associated with said tubes providing for a limited amount of relative turning movement thereof, cutting mechanism carried by said mower support, and driving connections between said motor and said cutting mechanism.

9. In a device of the character described, the combination of a tractor having a frame, a plate carried by said frame, a second plate resting upon said first plate, a vertical pivot connecting said plates and providing for relative turning movement thereof, bearings carried by said second plate, a mower support having a transverse member supported in said bearings and having a forwardly extending central member, a mower frame longitudinally pivoted to said central member for rocking movement transversely, a cross bar carried by said central member and provided with bearings, a transverse shaft mounted in said bearings and upon which said mower frame may have longitudinal rocking movement, and a cutting device carried by said mower frame.

10. In a device of the character described, the combination of a mower support having a longitudinally extending central member, a central mower frame longitudinally pivoted to said central member for making movement transversely, a cross bar carried by said central member and provided with bearings, a transverse shaft mounted in said bearings and upon which said central mower frame may have longitudinal rocking movement, a cutting device carried by said central mower frame, transverse members extending respectively out from the two sides of said mower support, side mower frames pivotally carried by said transverse members for rocking movement both transversely and longitudinally, and cutting devices carried by said side frames respectively.

11. In a device of the character described, the combination of a wheeled frame, a member supported from the front of said frame and provided with bearings, a mower support having a transverse member mounted in said bearings and having a forwardly extending central member, a central mower frame longitudinally pivoted to said central member for rocking movement transversely, a cross bar carried by said central member and provided with bearings, a transverse shaft mounted in said bearings and upon which said central mower frame may have longitudinal rocking movement, a cutting device carried by said central mower frame, transverse members extending out from the two sides respectively of said mower support, side mower frames pivotally carried by said transverse members for rocking movement both transversely and longitudinally, and cutting devices carried by said side frames respectively.

12. In a device of the character described, the combination of a tractor having a frame, a plate carried by said frame, a second plate resting upon said first plate, a vertical pivot connecting said plates and providing for relative turning movement thereof, bearings carried by said second plate, a mower support having a transverse member supported in said bearings and having a forwardly extending central member, a central mower frame longitudinally pivoted to said central member for rocking movement transversely, a cross bar carried by said central member and provided with bearings, a transverse shaft mounted in said bearings and upon which said mower frame may have longitudinal rocking movement, a cutting device carried by said mower frame, housings extending out transversely from the two sides of said mower support, a shaft mounted in said housings, side mower frames pivotally carried by said housings for rocking movement both transversely and longitudinally, cutting devices carried by said side frames respectively, connections for driving said last mentioned shaft from said motor, and connections for driving all of said cutting devices from said shaft.

13. In a device of the character described, the combination of a tractor having a frame, a motor supported by said frame, a tube attached to said frame, a second tube detachably mounted in said first tube, means associated with said tubes providing for a limited amount of relative turning movement of the tubes, a plate secured to the forward end of said second tube, a second plate resting upon said first plate, a bolt passing through said plates providing for relative turning movement of the plates, a releasable dog adapted to be engaged with said plates to prevent said turning movement, bearings carried by said second plate, a mower support having a horizontal member mounted in said bearings and having a forwardly extending central member, a central mower frame pivoted to said central member, a cutting device carried by said frame, a cross bar carried by said central member, said central mower frame having side bearings, a shaft mounted in said bearings upon which said mower frame may have longitudinal rocking movement, housings extending out transversely from the two sides of said mower support, a shaft mounted in said housings, side mower frames pivoted to said housings for rocking movement both transversely and longitudinally, stop devices associated with said cross bar for limiting said rocking movement, cutting devices carried by said side frames, means for driving the aforesaid shaft from said motor, and means for driving all of said cutting devices from said shaft.

EMIL H. PICHA.